(12) United States Patent
Lin

(10) Patent No.: US 7,503,806 B2
(45) Date of Patent: Mar. 17, 2009

(54) CARD CONNECTOR BASE AND CARD CONNECTOR ASSEMBLY

(75) Inventor: Keng-Liang Lin, Hsin-Tien (TW)

(73) Assignee: Advanced Connectek Inc., Hsin-Tien (TW)

( * ) Notice: Subject to any disclaimer, the term of this patent is extended or adjusted under 35 U.S.C. 154(b) by 0 days.

(21) Appl. No.: 12/228,786

(22) Filed: Aug. 15, 2008

(65) Prior Publication Data

US 2009/0047835 A1    Feb. 19, 2009

(30) Foreign Application Priority Data

Aug. 17, 2007    (TW) .............................. 96213710 U

(51) Int. Cl.
*H01R 24/00*    (2006.01)
(52) U.S. Cl. ..................................... 439/630
(58) Field of Classification Search ................. 439/630, 439/159

See application file for complete search history.

(56) References Cited

U.S. PATENT DOCUMENTS 6,932,652 B1 *   8/2005   Chen ........................... 439/630
7,314,390 B1 *   1/2008   Lai et al. ..................... 439/630

* cited by examiner

*Primary Examiner*—Tho D Ta
(74) *Attorney, Agent, or Firm*—C. G. Mersereau; Nikolai & Mersereau, P.A.

(57) ABSTRACT

A card connector base is mounted on a printed circuit board and has a metal-inserted housing, a pair of hooking assemblies and a card tray. The metal-inserted housing has a metal substrate and an insulative body. The insulative body is mounted securely on the metal substrate by an insert-molding process. The hook assemblies are mounted on the metal-inserted housing. The card tray is detachably mounted slidably in the metal-inserted housing. Because the metal substrate formed from the sheet-metal is thin and has fine structure strength such as tensile strength and compressive strength, the metal-inserted housing with the metal substrate is more compact and more structurally strong when compare to conventional insulative housings.

7 Claims, 9 Drawing Sheets

CARD CONNECTOR BASE AND CARD CONNECTOR ASSEMBLY

BACKGROUND OF THE INVENTION

1. Field of the Invention

The present invention relates to a connector base, and more particularly to a card connector base that has a compact metal-inserted housing to hold an electronic card.

2. Description of Related Art

A conventional card connector is mounted on a printed circuit board (PCB), may receive an electronic card and has an insulative housing and a plurality of terminals. The terminals are mounted securely in the insulative housing by insert-molding technology. However, to securely hold the terminals in place and allow the terminals to resiliently contact the electronic card to deform without any ruptures occurring on the insulative housing, the insulative housing must have a considerable dimension, especially a sufficient thickness.

However, electronic devices such as mobile phones are designed more and more compact and the so that an internal space of such compact electronic devices cannot accommodate the aforementioned card connector including the thick insulative housing.

To overcome the shortcomings, the present invention provides a card connector base to mitigate or obviate the aforementioned problems.

SUMMARY OF THE INVENTION

The main objective of the invention is to provide a card connector base that has a compact metal-inserted housing to hold and electronic card.

A card connector base in accordance with the present invention is mounted on a printed circuit board and has a metal-inserted housing, a pair of hooking assemblies and a card tray. The metal-inserted housing has a metal substrate and an insulative body. The insulative body is mounted securely on the metal substrate by an insert-molding process. The hook assemblies are mounted on the metal-inserted housing. The card tray is detachably mounted slidably in the metal-inserted housing.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
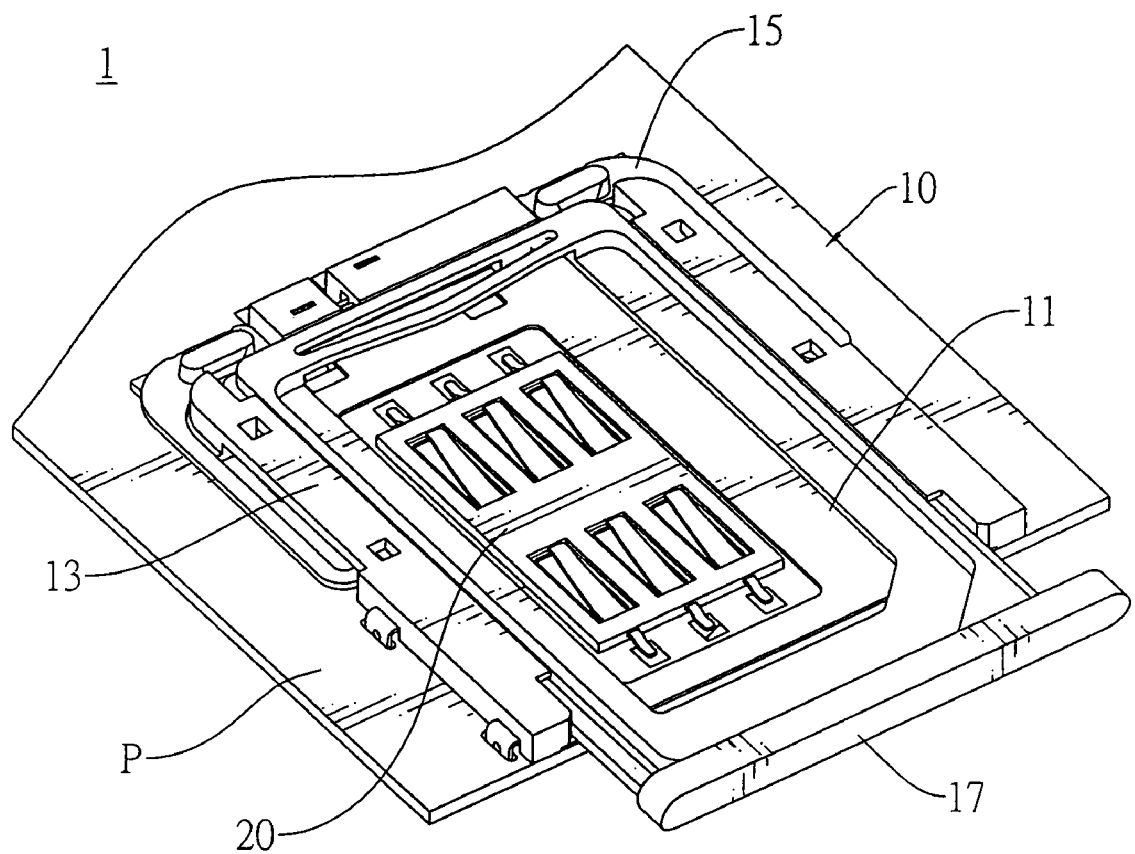
FIG. 1 is a top perspective view of a card connector assembly in accordance with the present invention having a card connector base.
Figure 2:
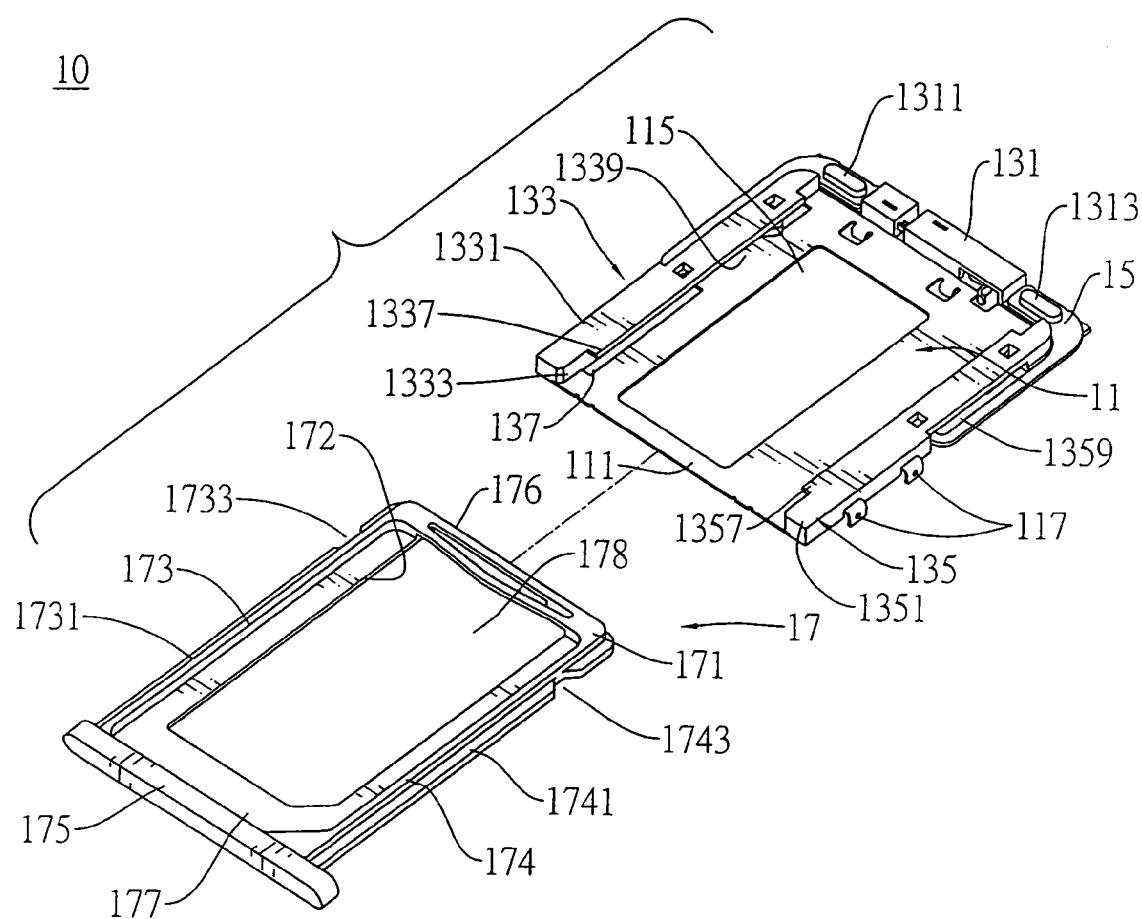
FIG. 2 is a partially exploded top perspective view of the card connector base in FIG. 1.
Figure 7:
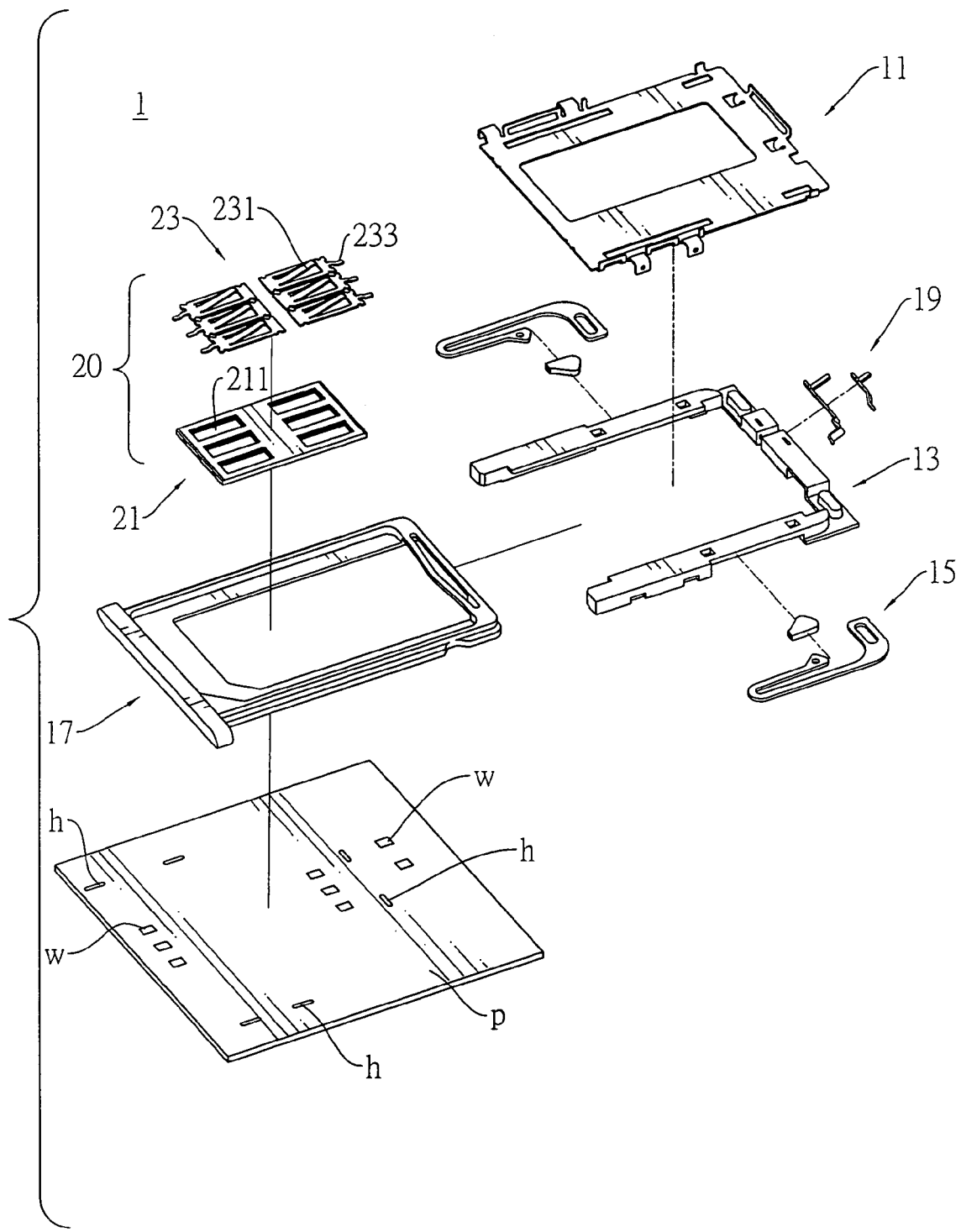
FIG. 7 is an exploded top perspective view of the card connector base in FIG. 1.

With reference to FIGS. 1, 2 and 7, a card connector assembly (1) in accordance with the present invention comprises a printed circuit board (PCB) (P), a card connector base (10) and a terminal assembly (20).

The PCB (P) has a circuit (W) and a plurality of positioning holes (h).

The card connector base (10) may receive an electronic card such as a Subscriber Identity Module (SIM) card and comprises a metal-inserted housing, a pair of hooking assemblies (15), a switch (19) and a card tray (17).

The metal-inserted housing has a metal substrate (11) and an insulative body (13).

Figure 3A:
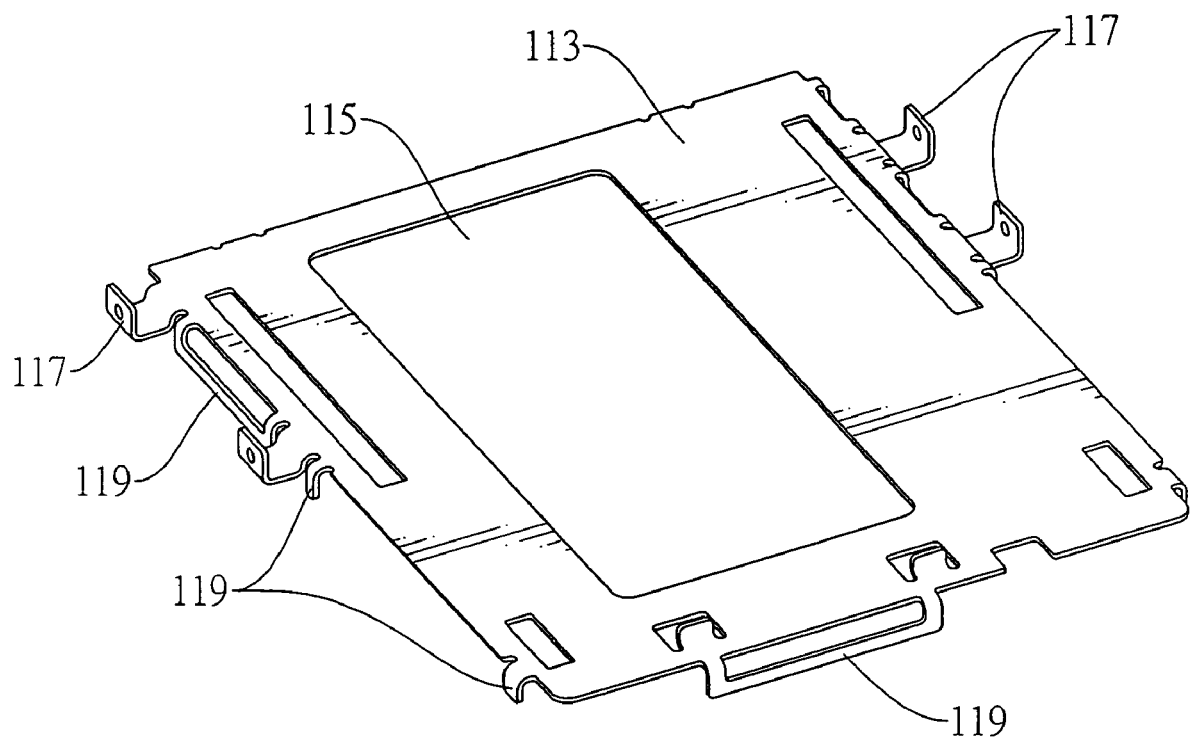
FIG. 3A is a bottom perspective view of a metal substrate of the metal-inserted housing of the card connector base in FIG. 2.
Figure 3B:
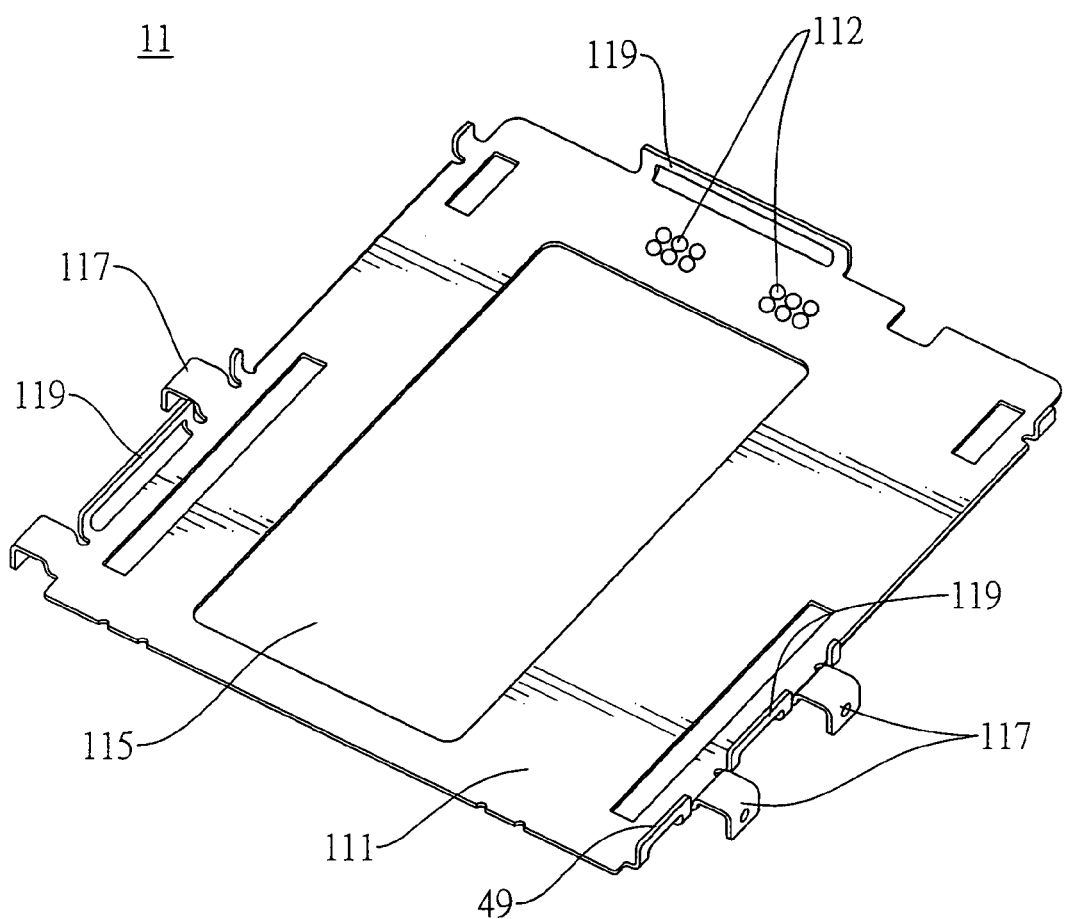
FIG. 3B is a top perspective view of the metal substrate of the card connector base in FIG. 3A further having soldering holes.

With further reference to FIGS. 3A and 3B, the metal substrate (11) may be rectangular and is formed from a sheet-metal by a stamping process. The metal substrate (11) has a top (111), a bottom (113), an outer edge, an opening (115), a plurality of soldering tabs (117) and a plurality of mounting bars (119) and may further have a plurality of soldering holes (112). The opening (115) is defined through the metal substrate (11). The soldering tabs (117) are L-shaped, are formed on and protrude downwards from the outer edge and are soldered respectively in the positioning holes (h) in the PCB (P). The mounting bars (119) are U-shaped, are formed on and protrude upwards from the outer edge and each mounting bar (119) has two ends connected to the outer edge. The soldering holes (112) are defined through the metal substrate (11) and are arranged in at least one array so that melted tin solder may flow the soldering holes (112) to securely mount the metal substrate (11) on the PCB (P).

Figure 4:
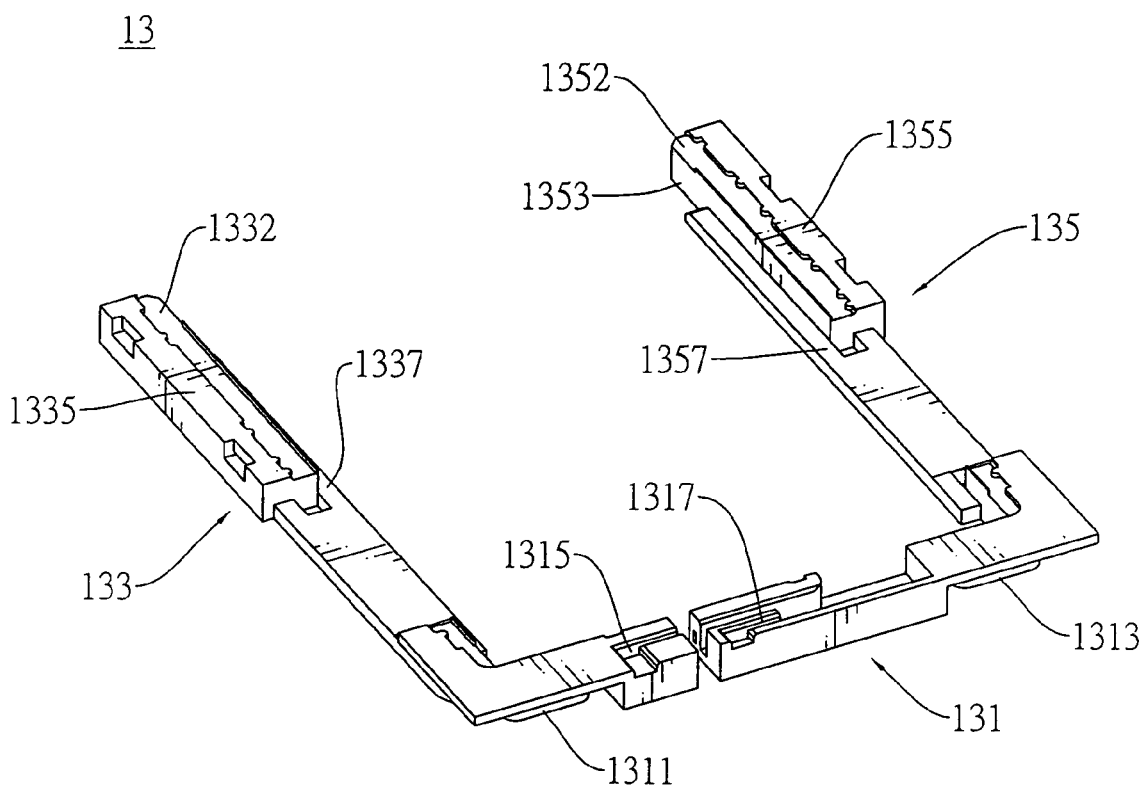
FIG. 4 is a bottom perspective view of the insulative body of the metal-inserted housing of the card connector base in FIG. 2.

With further reference to FIG. 4, the insulative body (13) is made of plastic, is U-shaped, is mounted securely on the top (111) of the metal substrate (11) by an insert-molding process and has an intermediate section (131) and two opposite side sections (133, 135).

The intermediate section (131) is mounted securely on the top (111) of metal substrate (11) and the has a top, a bottom, two ends and two hook mounts (1311, 1313) and may further have two mounting slits (1315, 1317). The hook mounts (1311, 1313) are formed on and protrude up from the top of the intermediate section (131). The mounting slits (1315, 1317) are L-shaped, are defined in the bottom of the intermediate section (131).

The side sections (133, 135) are formed perpendicularly on and protrude respectively from the ends of the intermediate section (131) and are mounted securely on the top (111) of metal substrate (11). Each side section (133, 135) has a top surface (1331, 1351), a bottom surface (1335, 1355), an inside surface (1333, 1353), a limiting strip (1337, 1357), an open slot (1339, 1359) and a mounting portion (1332, 1352). The limiting strip (1337, 1357) is formed on and protrudes transversely inwards from the inside surface (1333, 1352) and separates from the top (111) of the metal substrate (11) to define a rail slot (137) between the limiting strip (1337, 1357) and the top of the metal substrate (11). The open slot (1339, 1359) is defined transversely through the side section (133, 135). The mounting portion (1332, 1352) is formed on the bottom surface (1335, 1355) and securely covers and holds at least one of the mounting bars (119) by the insert-molding process.

Figure 6A:
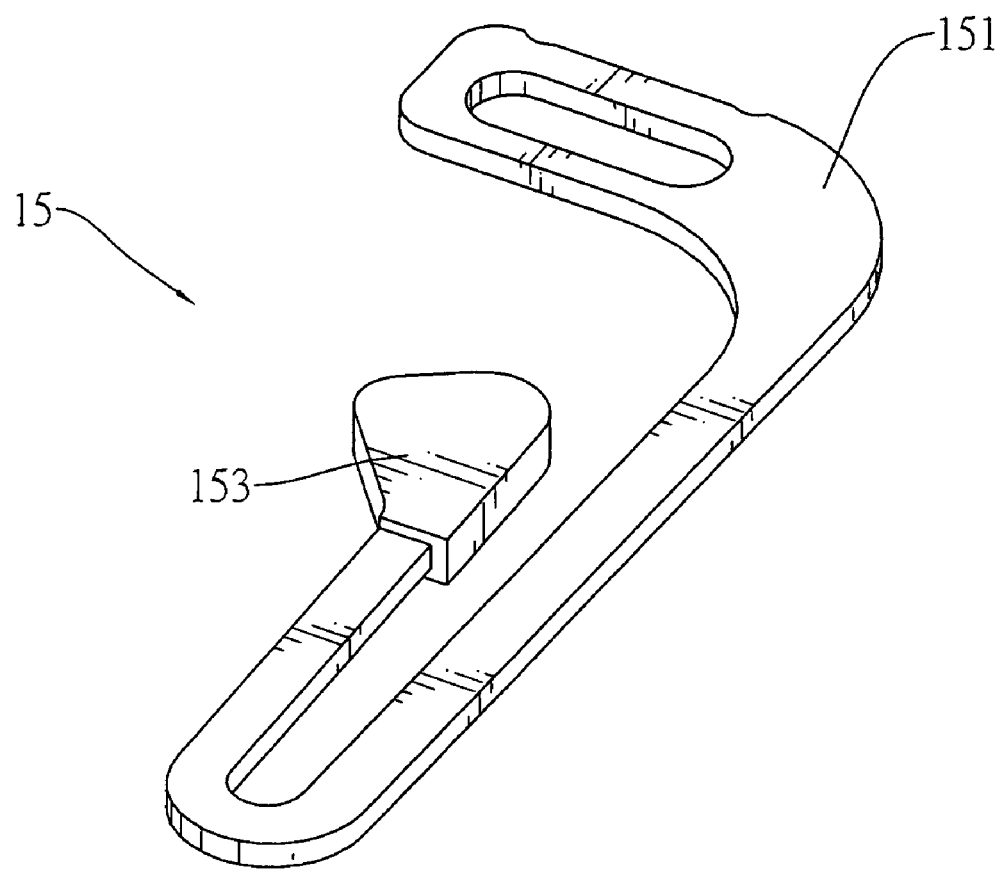
FIG. 6A is a top perspective view of the hooking assembly of the card connector base.
Figure 6B:
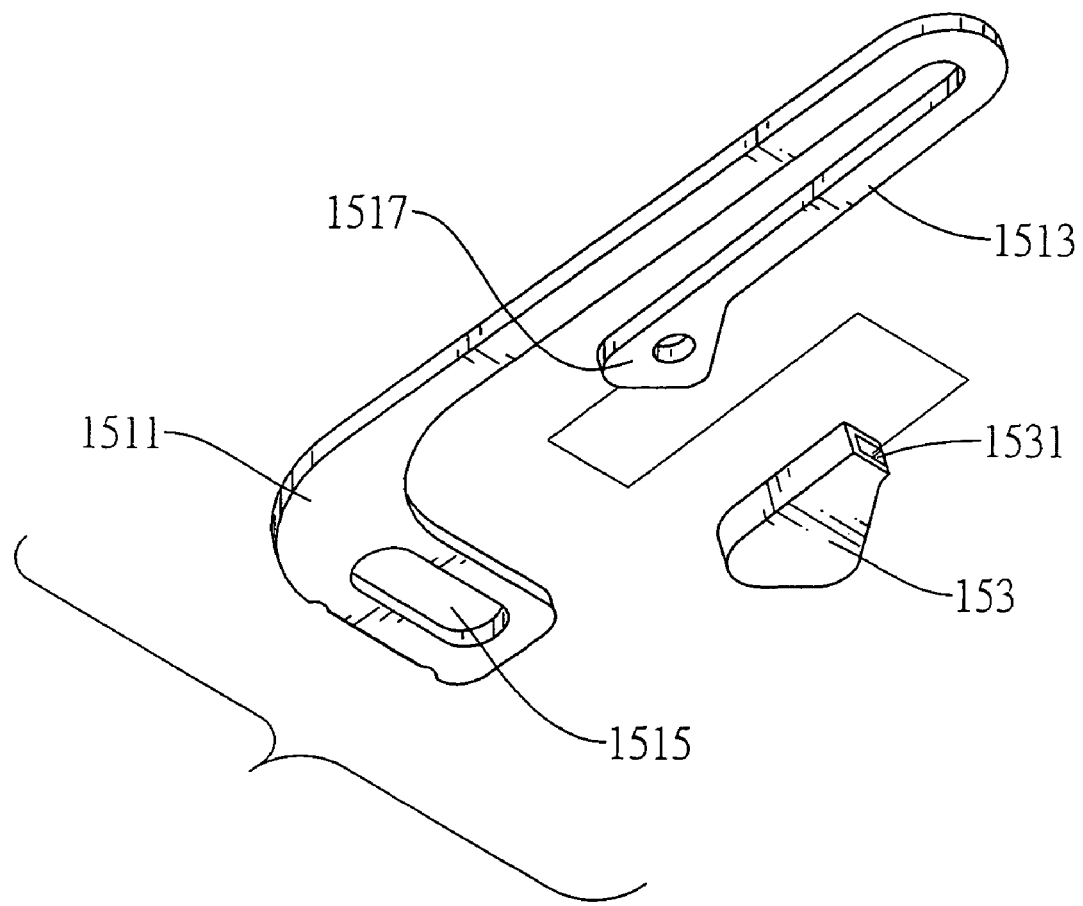
FIG. 6B is an exploded bottom perspective view of the hook assembly in FIG. 6A.

With further reference to FIGS. 6A and 6B, the hooking assemblies (15) are mounted on insulative body (13), are located respectively adjacent to the side sections (133, 135) and each hooking assembly (15) has a hook (151) and a sheath (153).

The hook (151) is made of metal such as stainless steel, is mounted on the insulative body (13) and has a mounting portion (1511), a resilient portion (1513) and a hooking portion (1517). The mounting portion (1511) is mounted on the intermediate section (131) of the insulative body (13) and has a mounting slot (1515) defined through the mounting portion (1511) and mounted around one of the hook mounts (1311, 1313). The resilient portion (1513) is U-shaped and is formed on and protrudes perpendicularly from the mounting portion (1511). The hooking portion (1517) is angled, is formed on and protrudes from the resilient portion (1513) and extends through one of the open slots (1339, 1359).

The sheath (153) is angled, is made of plastic or rubber, covers the hooking portion (1517) of the hook (151) by an over molding process and has hardness and a fitting hole (1531). The fitting hole (1531) is defined in the sheath (153) and is mounted around the hooking portion (1517).

Figure 5:
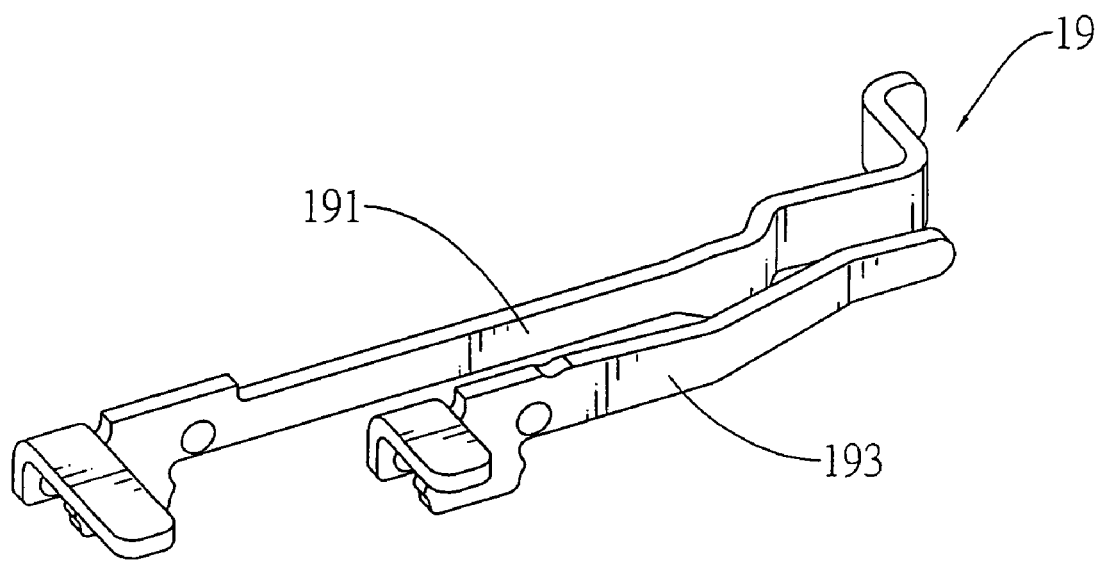
FIG. 5 is a bottom perspective view of the switch of the card connector base in FIG. 2.

With further reference to FIG. 5, the switch (19) is mounted in the bottom of the intermediate section (131) of the insulative body (13), is connected electrically to the circuit (W) on the PCB (P) and has a stationary contact (193) and a movable contact (191). The stationary contact (193) is mounted in one mounting slit (1317). The movable contact (191) is resilient and longitudinal, is mounted in the other mounting slit (1315) and selectively contacts the stationary contact (193) to activate the circuit (W) of the PCB (P).

The card tray (17) is detachably mounted slidably in the metal-inserted housing, selectively abuts against the intermediate section (131) of the insulative body (131), selectively presses against and bends the movable contact (191) to contact the stationary contact (193) and may receive and carry the electronic card. The card tray (17) has a top (171), a bottom (172), an outside end (175), an inside end (176), two opposite sides (173, 174), a bottom opening (178), a space (177), two slides (1731, 1741) and two positioning notches (1733, 1743).

The bottom opening (178) is defined through the bottom (172).

The space (177) is defined in the card tray (17), communicates with bottom opening (178) and may receive the electronic card.

The slides (1731, 1741) are longitudinal, are formed respectively on the sides (173, 174) and are slidably mounted respectively in the rail slots (137) between the limiting strips (1337, 1357) of the insulative body (13) and the metal substrate (11).

The positioning notches (1733, 1734) are triangular, are transversely defined respectively in the slides (1731, 1741) and are selectively engaged respectively with the hooking portions (1517) of the hooks (15) to hold the card tray (17) in the metal-inserted housing.

The terminal assembly (20) is mounted in the opening (115) of the metal substrate (11) of the metal-inserted housing and has a plurality of terminals (23) and a bracket (21).

The terminals (23) are mounted in the opening (115) in the metal substrate (11), are soldered on the PCB (P) and each terminal (23) has a contacting section (231) and a soldering section (233). The contacting section (231) is resilient and may contact one contact on the electronic card. The soldering section (233) is formed on the contacting section (231) and is soldered on the PCB (P).

The bracket (21) is mounted in the opening (115) of the metal substrate (11), presses against and holds the terminals (23) and has a plurality of positioning slots (211). The positioning slots (211) are defined through the bracket (21) and allows the contacting sections (231) of the terminals (23) to extend respectively through the positioning slots (211).

Because the metal substrate (11) formed from the sheet-metal is thin and has fine structure strength such as tensile strength and compressive strength, the metal-inserted housing with the metal substrate (11) would be more compact and more structurally strong when compared to insulative housings of conventional card connector. Therefore, the card connector assembly (1) with the metal substrate (11) is excellently compact and may be easily fitted into the portable electronic devices such as cellular phones.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A card connector base comprising:
a metal-inserted housing having
a metal substrate formed from a sheet-metal and having
a top;
a bottom;
an outer edge;
an opening;
a plurality of soldering tabs formed on and protruding downwards from the outer edge; and
a plurality of mounting bars formed on and protruding upwards from the outer edge; and
an insulative body mounted securely on the of the metal substrate by an insert-molding process and having
an intermediate section having a top, a bottom and two ends; and
two opposite side sections formed perpendicularly on and protruding respectively from the ends of the intermediate section and each side section having a top surface, a bottom surface and an inside surface and further having
a limiting strip formed on and protruding transversely inwards from the inside surface and separating from the top of the metal substrate to define a rail slot between the limiting strip and the metal substrate;
an open slot defined transversely through the side section; and
a mounting portion formed on the bottom surface and securely covering and holding at least one of the mounting bars by the insert-molding process;
a pair of hooking assemblies mounted on insulative body, located respectively adjacent to the side sections and each hooking assembly having
a hook mounted on the insulative body and having
a mounting portion mounted on the intermediate section of the insulative body;
a resilient portion formed on and protruding perpendicularly from the mounting portion; and
a hooking portion being angled, formed on and protruding from the resilient portion and extending through one of the open slots; and a sheath covering the hooking portion of the hook; and
a card tray detachably mounted slidably in the metal-inserted housing, selectively abutting against the intermediate section of the insulative body, having a top, a bottom, an outside end, an inside end and two opposite sides and further having
two slides formed respectively on the sides and slidably mounted respectively in the rail slots; and
two positioning notches transversely defined respectively in the slides and selectively engaged respectively with the hooking portions of the hooks.

2. The card connector base as claimed in claim 1, wherein each sheath is made of plastic.

3. The card connector base as claimed in claim 2, wherein each hook is made of stainless steel.

4. The card connector base as claimed in claim 3, wherein:
the intermediate section of the insulative body further has two hook mounts formed on and protruding up from the top of the intermediate section; and
the mounting portion of each hook has a mounting slot defined through the mounting portion and mounted around one of the hook mounts.

5. The card connector base as claimed in claim 4, wherein the intermediate section of the insulative body further has
two mounting slits defined in the bottom of the intermediate section; and
a switch is mounted on the insulative body and has
a stationary contact mounted in one mounting slit; and
a movable contact being resilient, mounted in the other mounting slit and selectively contacting the stationary contact.

6. The card connector base as claimed in claim 5, wherein the metal substrate further has a plurality of soldering holes defined through the metal substrate.

7. The card connector assembly comprising:
a printed circuit board (PCB) having a circuit and a plurality of positioning holes;
a metal-inserted housing having
a metal substrate formed from a sheet-metal and having
a top;
a bottom;
an outer edge;
an opening defined through the metal substrate;
a plurality of soldering tabs formed on and protruding downwards from the outer edge and soldered respectively in the positioning holes in the PCB; and
a plurality of mounting bars formed on and protruding upwards from the outer edge; and
an insulative body mounted securely on the of the metal substrate by an insert-molding process and having
an intermediate section having a top, a bottom and two ends; and
two opposite side sections formed perpendicularly on and protruding respectively from the ends of the intermediate section and each side section having a top surface, a bottom surface and an inside surface and further having
a limiting strip formed on and protruding transversely inwards from the inside surface and separating from the top of the metal substrate to define a rail slot between the limiting strip and the metal substrate;
an open slot defined transversely through the side section; and
a mounting portion formed on the bottom surface and securely covering and holding at least one of the mounting bars by the insert-molding process;
a pair of hooking assemblies mounted on insulative body, located respectively adjacent to the side sections and each hooking assembly having
a hook mounted on the insulative body and having
a mounting portion mounted on the intermediate section of the insulative body;
a resilient portion formed on and protruding perpendicularly from the mounting portion; and
a hooking portion being angled, formed on and protruding from the resilient portion and extending through one of the open slots; and
a sheath covering the hooking portion of the hook; and
a card tray detachably mounted slidably in the metal-inserted housing, selectively abutting against the intermediate section of the insulative body, having a top, a bottom, an outside end, an inside end and two opposite sides and further having
a bottom opening defined through the bottom of the card tray;
a space defined in the card tray and communicating with the bottom opening;
two slides formed respectively on the sides and slidably mounted respectively in the rail slots; and
two positioning notches transversely defined respectively in the slides and selectively engaged respectively with the hooking portions of the hooks; and
a terminal assembly mounted in the opening of the metal substrate of the metal-inserted housing and having
a plurality of terminals mounted in the opening in the metal substrate and soldered on the PCB each terminal having a contacting section; and
a bracket mounted in the opening of the metal substrate and having a plurality of positioning slots defined through the bracket and through which the contacting sections of the terminals extend respectively.

* * * * *